United States Patent Office 3,257,424
Patented June 21, 1966

3,257,424
FLUORINATED STEROIDS
John S. Tadanier, Chicago, and John Wayne Cole, Deerfield, Ill., assignors to Abbott Laboratories, North Chicago, Ill., a corporation of Illinois
No Drawing. Filed Oct. 4, 1963, Ser. No. 313,774
5 Claims. (Cl. 260—397.3)

This application is a continuation-in-part of our earlier filed application, Serial No. 167,413, filed January 19, 1962, now abandoned.

The present invention relates to a new group of steroids. More particularly, it relates to a new series of fluorinated androstanes and pregnanes.

According to the present invention, compounds of the structure

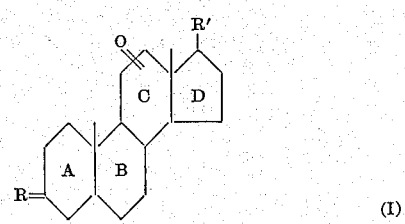

are provided wherein the A-ring has a structure selected from the partial structures

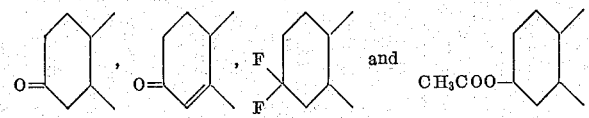

and wherein R' is =O,

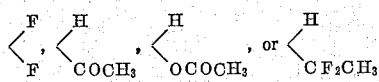

with the further provision that the compound contains at least one carbon atom with the gem-difluoro structure. The keto-group of the C-ring can be in the 11- or 12-position.

The above compounds are hereinafter referred to simply as gem-difluorosteroids since by the above definition they all contain one or two carbon atoms carrying two fluorine atoms. Carbon atoms which may be substituted in this manner are those in the 3-, 17-, or 20-position of the steroid nucleus.

The gem-difluorosteroids of the present invention are useful therapeutic agents, possessing valuable hormonal activities as androgen-antiandrogens. This kind of activity has been described in more detail by Dorfman and Dorfman in Acta Endocrinologica, volume 33, page 308 (1960) and can be observed by endocrine assays in warm-blooded animals. The novel compounds, when used in therapy, can be administered in a wide variety of oral or parenteral dosage forms, singly or in admixture with other active compounds. They can be associated with a pharmaceutical carrier which may be solid or liquid. Solid compositions can be processed into tablets, powders, capsules or the like, and the liquid compositions may be solutions, dispersions, suspensions, emulsions or elixirs.

For the preparation of the above-described new compounds, a steroid of the formula

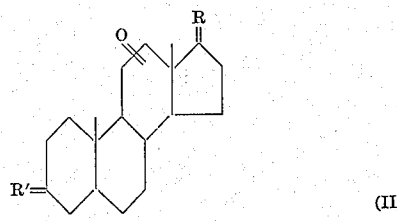

wherein R is =O,

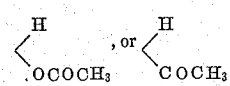

and R' is =O or

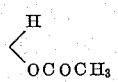

is dissolved in an inert, non-aqueous solvent such as chloroform and mixed with sulfur tetrafluoride in the presence of a catalytic amount of boron trifluoride or hydrogen fluoride. Boron trifluoride can be replaced by other Lewis acids, producing similar results. When hydrogen fluoride is intended to be used as the catalyst, it may be added directly as such or, alternatively, it may be formed in situ by the addition of a small amount of a hydroxy compound, e.g. water, methanol, ethanol, isopropanol, phenol, etc. to the reaction mixture. When boron trifluoride or other Lewis acids are used, they are added directly to the reaction mixture.

The desired reaction takes place slowly at low temperatures and rapidly at more elevated temperatures. We have found that about 40° C. is a suitable temperature for the formation of the new gem-difluoro steroids; a practical temperature range for the above-described reaction is between about 0° and about 60° C. Under these conditions a keto-group in the C-ring remains substantially unaffected, while keto-groups in the 3-, 17-, or 20-position react to the corresponding gem-difluoro structures.

The above reference to "inert, non-aqueous solvents" as the reaction medium is used to express that the solvent is chosen in such a manner that it will not react with any of the reactants or the formed gem-difluorosteroid in the reaction mixture. As explained above, compounds containing a hydroxy group are therefore excluded by this term since such solvents react with sulfur tetrafluoride. Solvents suitable for the present reaction are carbon tetrachloride, chloroform, ether, methylene chloride, benzene and other saturated or aromatic liquids free of hydroxy- and keto-groups.

Where the starting material of Formula II contains keto-groups in the 3- and 17-position, both these keto-groups are replaceable by the gem-difluoro substituent without affecting the keto-group at 11 or 12 to any appreciable extent. The same holds true if the 17-position of the steroid carries a substituent which includes a keto-group, as for instance in the case of pregnan-3,11,20-triones. Where the starting material contains only one other keto-group aside from that in the 11- or 12-position, e.g., in 17-acetoxyandrostane-3,11-dione, in 3-acetoxyandrostane-12,17-dione, or in 3-acetoxypregnane-11,20-dione, only one keto-group undergoes the above conversion, again without any appreciable reaction taking place in the 11- or 12-position.

A detailed description of the production of the new compounds is found in the following examples, which are meant to be illustrations only and do not constitute the only embodiments of the present invention.

EXAMPLE 1

*3,3,20,20-tetrafluoro-5α-pregnan-11-one*

A solution of 3 grams of 5α-pregnane-3,11,20-trione in 30 ml. of chloroform containing 3% ethanol is heated to 40° C. for 15 hours with 14 grams of sulfur tetrafluoride. After removal of the excess sulfur tetrafluoride by evaporation the product is worked up by separating it with chloroform and water. The combined chloroform solutions are chromatographed on neutral alumina of activity 111. The alumina column is then eluted with benzene/Skellysolve B (1:10) (Skellysolve B is a petroleum ether fraction boiling at 60–80°), yielding 545 mg. of crystalline material from which 290 mg. of pure 3,3,20,20-tetrafluoro-5α-pregnan-11-one melting at 170–1° C. is obtained after recrystallization from benzene/Skellysolve B (1:10). The new compound analyzes 66.83% C, 7.90% H, and 19.94% F, which corresponds with the calculated values for $C_{21}H_{30}OF_4$.

In a modification of this example, the above chloroform is replaced with methylene chloride to which 0.3 gram of boron trifluoride is added as catalyst. Substantially the same result is obtained after the work-up described above.

EXAMPLE 2

*3,3-difluoro-5α-pregnane-11,20-dione*

Further elution of the above alumina column with benzene/Skellysolve B (1:5) yields 1.36 grams of crystalline material from which 890 mg. of pure 3,3-difluoro-5α-pregnane-11,20-dione melting at 155–6° C. is obtained after recrystallization from benzene/Skellysolve B (1:5). The analysis of this product shows 71.81% C, 8.36% H, and 10.53% F, corresponding with the calculated values for $C_{21}H_{30}O_2F_2$.

EXAMPLE 3

*3,3,20,20-tetrafluoro-5 -pregnan-11-one*

A solution of 2 grams of 5β-pregnane-3,11,20-trione in 20 ml. of chloroform containing 3% ethanol is heated for 15 hours at 40° C. with 10 grams of sulfur tetrafluoride. After evaporation, the residue is extracted with chloroform and water and the chloroform solution is absorbed on neutral alumina in a chromatography column. Elution with benzene/Skellysolve B (1:10) yields 168 mg. of white crystalline material melting at 162–4° C. Recrystallization of this material produces 122 mg. of pure 3,3,20,20-tetrafluoro-5β-pregnan-11-one melting at 167–8° C., by using benzene/Skellysolve B (1:10) as the recrystallization medium. An analytical sample of this product shows 67.58% C, 8.03% H, and 20.77% F, corresponding with the calculated values for $C_{21}H_{30}OF_4$.

Analogous results are obtained by replacing Skellysolve B in this example with hexane.

EXAMPLE 4

*3,3-difluoro-5-pregnane-11,20-dione*

By further elution of the alumina column of the previous example with benzene/Skellysolve B (1:1), 603 mg. of a crystalline solid is obtained, melting at 133–9° C. Recrystallization of this material with benzene/Skellysolve B (1:1) yields 391 mg. of pure 3,3-difluoro-5β-pregnane-11,20-dione. An analytical sample shows 71.84% C, 8.61% H, and 10.87% F, corresponding with calculated values for $C_{21}H_{30}O_2F_2$.

EXAMPLE 5

*3,3,17,17-tetrafluoro-5α-androstan-11-one*

A solution of 2.1 grams of 5α-androstane-3,11,17-trione in 20 ml. of chloroform containing 1% hydrogen fluoride is heated at 40° C. in a stainless steel pressure cylinder with 10.6 grams of sulfur tetrafluoride for 15 hours. The gaseous products are removed thereafter and the residue is washed into a 500-ml. separatory funnel with five 50-ml. portions of chloroform. The resulting chloroform solution is washed with two 100-ml. portions of water, 100-ml. of 5% sodium bicarbonate solution, and finally with two 100-ml. portions of water. The chloroform solution is then dried over anhydrous magnesium sulfate and concentrated under partial vacuum on a steam bath, leaving a dark brown residue. This material is extracted with two portions of 200 ml. each of boiling ethanol, and the combined extracts are subsequently treated with carbon and filtered through Celite (a hydrated, amorphous, diatomaceous silica). The filter cake is washed with 100 ml. of hot ethanol and the washings are combined with the previous ethanol solution. The solution is stripped of solvent under partial vacuum on a steam bath, and the residue so obtained is chromatographed on a column of neutral alumina. Elution with benzene/hexane (1:10) yields 3,3,17,17-tetrafluoro-5α-androstan-11-one. The analytical values confirm the empirical formula of $C_{19}H_{26}OF_4$.

EXAMPLE 6

*3,3-difluoro-5α-androstane-11,17-dione*

The alumina column used in the chromatogram of Example 5 is further eluted with benzene from which solution, after the usual work-up, 3,3-difluoro-5α-androstane-11,17-dione is obtained as white crystals. The analytical values correspond with the empirical formula $C_{19}H_{26}O_2F_2$.

EXAMPLE 7

*3,3,17,17-tetrafluoro-5β-androstan-11-one*

By following the procedure outlined in Example 5, 5β-androstane-3,11,17-trione is fluorinated to produce 3,3,17,17-tetrafluoro-5β-androstan-11-one by elution of the alumina column with benzene/hexane (1:10).

EXAMPLE 8

*3,3,difluoro-5β-androstane-11,17-dione*

After elution of the 3,3,17,17-tetrafluoro-5β-androstan-11-one according to Example 7, the alumina column is further eluted with benzene from which 3,3-difluoro-5β-androstane-11,17-dione is recovered upon evaporation of the solvent.

EXAMPLE 9

*17,17-difluoroandrost-4-ene-3,11-dione*

A mixture of 2.2 grams of androst-4-ene-3,11,17-trione, 8.0 grams of sulfur tetrafluoride, 0.4 gram of boron trifluoride, and 20 ml. of ethanol-free chloroform is heated for 10 hours in an autoclave at 40° C. The reaction mixture is allowed to cool to room temperature and the gaseous products are stripped. The residue is washed into a 500-ml. separatory funnel with six 50-ml. portions of chloroform. The black resinous by-product is discarded. The chloroform solution is twice washed with 100-ml. portions of water, and subsequently with 100-ml. of 5% sodium bicarbonate and finally with two 100-ml. portions of water. The chloroform solution is dried over anhydrous magnesium sulfate and the chloroform is stripped under partial vacuum on a steam bath to leave a dark crystalline residue. This material is heated with 80 ml. of boiling ethanol, decolorized with carbon, and filtered through Celite. The carbon/Celite mat is washed with three 25-ml. portions of boiling ethanol and the washings are added to the original ethanol filtrate. The ethanol is stripped under partial vacuum in the steam bath leaving a brown precipitate. This material is chromatographed on 70 grams of alumina and eluted with benzene/hexane (1:1), yielding a crystalline solid upon evaporation of the solution. Recrystallization from ethanol/water produces 17,17-difluoroandrost-4-ene-3,11-dione. The analysis corresponds to the calculated values for $$C_{19}H_{24}O_2F_2$$

EXAMPLE 10

*17,17-difluoro-5α-androstane-3,11-dione*

Upon hydrogenation of 17,17-difluoroandrost-4-ene-3,11-dione of Example 9 in the presence of palladium catalyst according to the method described by Steiger and Reichstein in Helv. Chem. Acta, volume 20, pages 822 ff. (1937), a good yield of 17,17-difluoro-5α-androstane-3,11-dione is obtained.

EXAMPLE 11

*20,20-difluoropregn-4-ene-3,11-dione*

By substituting the androst-4-ene-3,11,17-trione in Example 9 with pregn-4-ene-3,11,20-trione, but otherwise following the procedure in Example 9, 20,20-difluoropregn-4-ene-3,11-dione is obtained. The analysis is in agreement with the calculated values for the empirical formula $C_{21}H_{28}O_2F_2$.

EXAMPLE 12

*20,20-difluoro-5α-pregnane-3,11-dione*

By hydrogenating 20,20-difluoropregn-4-ene-3,11-dione in the presence of palladium catalyst according to Example 10, a good yield of 20,20-difluoro-5α-pregnane-3,11-dione is obtained. The analysis is in agreement with the calculated values for $C_{21}H_{30}O_2F_2$.

EXAMPLE 13

*17β-acetoxy-3,3-difluoro-5β-androstan-11-one*

From the reaction of 17β-acetoxy-5β-androstane-3,11-dione with sulfur tetrafluoride under the conditions described in Example 3, followed by elution of the alumina column with benzene/Skellysolve B (1:1) and evaporation of the eluate, 17β-acetoxy-3,3-difluoro-5β-androstan-11-one is obtained. The analytical values obtained are in agreement with the compound of the empirical formula $C_{21}H_{30}F_2O_3$.

EXAMPLE 14

*3α-acetoxy-20,20-difluoro-5β-pregnan-11-one*

By substituting 3α-acetoxy-5β-pregnan-11,20-dione for the androst-4-ene-3,11,17-trione in Example 9, 3α-acetoxy-20,20-difluoro-5β-pregnan-11-one of the formula $$C_{23}H_{34}F_2O_3$$

is obtained.

EXAMPLE 15

*20,20-difluoro-5β-pregnane-3,11-dione*

The 3α-acetoxy-20,20-difluoro-5β-pregnan-11-one of Example 14 is hydrolyzed with 2% potassium hydroxide in methanol, followed by evaporation and water-washing the residue to obtain 3α-hydroxy-20,20-difluoro-5β-pregnan-11-one. Oxidation with chromic acid in acetic acid solution at room temperature for four hours, and addition of water to precipitate the product, yields 20,20-difluoro-5β-pregnane-3,11-dione of the formula $C_{21}H_{30}F_2O_2$.

EXAMPLE 16

*3α-acetoxy-17,17-difluoro-5β-androstan-11-one*

By mixing 1 part of 3α-acetoxy-5β-androstane-11,17-dione with 10 parts of ethanol-free chloroform, 4 parts of sulfur tetrafluoride, and 0.2 part of boron trifluoride, and treating the mixture as described in Example 9, 3α-acetoxy-17,17-difluoro-5β-androstan-11-one of the empirical formula $C_{21}H_{30}F_2O_3$ is obtained.

EXAMPLE 17

*3,3,17,17-tetrafluoro-5α-androstan-12-one*

In a repetition of Example 5 but using 5α-androstane-3,12,17-trione (described by Adams et al. in J. Chem. Soc. 1954, 2298) as the starting material and otherwise proceeding as described, 3,3,17,17-tetrafluoro-5α-androstan-12-one is obtained, which can be worked up to an analytically pure sample as described in Example 5.

The corresponding 5β-isomer is made by the same process but using the corresponding 5β-compound (see Reichstein, Helv. 28, 863, of 1945) as the starting material.

EXAMPLE 18

*3,3-difluoro-5α-androstane-12,17-dione*

By further eluting the alumina column used in the chromatogram of Example 17 with benzene, 3,3-difluoro-5α-androstane-12,17-dione is obtained as white crystals. The analytical values correspond with those calculated for the empirical formula $C_{19}H_{26}O_2F_2$.

EXAMPLE 19

*3,3,20,20-tetrafluoro-5β-pregnan-12-one*

By following the procedure shown in Example 3 but using 5β-pregnane-3,12,20-trione as the starting material (described by Wagner et al., J.A.C.S. 71, 3856, of 1949), 3,3,20,20-tetrafluoro-5β-pregnan-12-one is obtained in pure form by recrystallization of the crude material obtained according to Example 3.

The corresponding 5α-isomer is obtained in the same fashion by using 5α-pregnane-3,12,20-trione (described by Wagner et al. ibid).

EXAMPLE 20

*3,3-difluoro-5β-pregnane-12,20-dione*

By further elution of the alumina column of the previous example with benzene/Skellysolve B (1:1), a crystalline solid is obtained which can be crystallized from the same solvent mixture to produce an analytical sample of 3,3-difluoro-5β-pregnane-12,20-dione of which the analytical values correspond with those calculated for the compound of empirical formula $C_{21}H_{30}O_2F_2$.

It will be seen from the above examples that the work-up of the desired compounds always includes exposure thereof to water which has the effect of breaking and dissolving any remaining Lewis-acid complexes.

In all the above examples, the assigned structures are found to agree with the ultraviolet and infrared spectra expected for such compounds. The melting points were all determined in a Fisher-Johns melting point apparatus.

Others may practice the invention in any of the numerous ways which will be suggested to one skilled in the art by the present disclosure. All such practice of the invention is considered a part hereof provided it falls within the scope of the appended claims.

We claim:

1. Gem-difluorosteroids of the formula

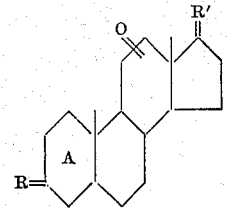

wherein the A-ring has a partial structure selected from the group consisting of

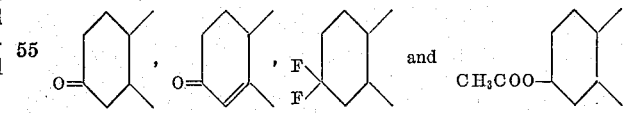

and wherein R' is selected from the group consisting of

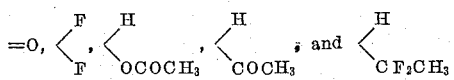

and wherein at least one of the substituents R and R' includes fluorine.

2. 3,3,20,20-tetrafluoro-5α-pregnan-11-one.
3. 3,3-difluoro-5α-pregnane-11,20-dione.
4. 3,3,20,20-tetrafluoro-5β-pregnan-11-one.
5. 3,3-difluoro-5β-pregnane-11,20-dione.

No references cited.

LEWIS GOTTS, *Primary Examiner.*

ELBERT L. ROBERTS, *Examiner.*